United States Patent
Ochman et al.

(10) Patent No.: US 10,749,621 B2
(45) Date of Patent: Aug. 18, 2020

(54) RADIO COMMUNICATION REPEATER, A RADIO COMMUNICATION SYSTEM AND METHOD

(71) Applicant: PROFIL MET SP. J. JASINSKI, LEITER, Ruda Slaska (PL)

(72) Inventors: Lukasz Ochman, Swietochlowice (PL); Aleksandra Kowalik, Bytom (PL); Joanna Plachetka, Katowice (PL)

(73) Assignee: PROFIL MET SP. J. JASINSKI, LEITER, Ruda Slaska (PL)

( * ) Notice: Subject to any disclaimer, the term of this patent is extended or adjusted under 35 U.S.C. 154(b) by 0 days.

(21) Appl. No.: 16/317,547

(22) PCT Filed: Jul. 13, 2017

(86) PCT No.: PCT/EP2017/067715
§ 371 (c)(1),
(2) Date: Jan. 13, 2019

(87) PCT Pub. No.: WO2018/011348
PCT Pub. Date: Jan. 18, 2018

(65) Prior Publication Data
US 2019/0280794 A1    Sep. 12, 2019

(30) Foreign Application Priority Data
Jul. 14, 2016  (EP) ..................................... 16461537

(51) Int. Cl.
H04J 3/06    (2006.01)
H04B 7/155   (2006.01)
(Continued)

(52) U.S. Cl.
CPC ........ *H04J 3/0629* (2013.01); *H04B 7/15528* (2013.01); *H04J 3/0694* (2013.01); *H04L 7/005* (2013.01); *H04W 28/10* (2013.01)

(58) Field of Classification Search
CPC ..... H04J 3/0629; H04J 3/0694; H04W 28/10; H04B 7/15528; H04L 7/005
See application file for complete search history.

(56) References Cited

U.S. PATENT DOCUMENTS 5,481,539 A     1/1996  Hershey et al.
5,598,414 A *   1/1997  Walser ................. H04L 12/422
                                                       370/455

(Continued)

*Primary Examiner* — Sam K Ahn
*Assistant Examiner* — Amneet Singh
(74) *Attorney, Agent, or Firm* — Mark M. Friedman (57) ABSTRACT

A radio communication repeater for operating in a Time Division Multiple Access radio communication system with a plurality of time slots to transmit packets. The repeater includes a transmitter to transmit a plurality of the packets in a transmit time slot assigned to that repeater and a receiver to receive a plurality of the packets from all other time slots of the TDMA radio communication system other than the transmit time slot assigned to that repeater. The repeater also includes a controller to process the received packets from all other time slots of the TDMA radio communication system other than the transmit time slot assigned to that repeater and, if the received packets have different recipient identifiers, to forward the received packets for transmission by the transmitter in the transmit time slot assigned to that repeater as a frame comprising a plurality of packets having different recipient identifiers.

9 Claims, 11 Drawing Sheets (51) Int. Cl.
*H04L 7/00* (2006.01)
*H04W 28/10* (2009.01)

(56) References Cited

U.S. PATENT DOCUMENTS

| | | | |
|---|---|---|---|
| 2004/0184442 A1* | 9/2004 | Jones | H04B 7/155 370/351 |
| 2008/0316968 A1* | 12/2008 | Sun | H04B 7/15535 370/331 |
| 2010/0189013 A1* | 7/2010 | Bims | H04B 7/022 370/254 |
| 2011/0211512 A1 | 9/2011 | Kimura | |
| 2012/0195252 A1 | 8/2012 | Suga | |

* cited by examiner

RADIO COMMUNICATION REPEATER, A RADIO COMMUNICATION SYSTEM AND METHOD

TECHNICAL FIELD

The present invention relates to radio communication, useful in particular for simultaneous communication between a plurality of stations.

BACKGROUND

There are known several communication methods designed for wireless communication between mobile stations.

Time division multiple access (TDMA) is a channel access method for shared medium networks. It allows several radio stations to share the same frequency channel by dividing the signal into different time slots. The stations transmit in rapid succession, one after the other, each using its own time slot.

There are known time divided duplex radio communication systems, which utilize time slots of equal duration, wherein one data packet is sent per each time slot. This can be inefficient in case the data packet is shorter than the transmission capacity of the time slot.

GSM (Global System for Mobile Communications) is an example of a well-known cellular telephony system, wherein a plurality of mobile stations (cell phones) communicate with each other via a base station. Individual TDMA channels are formed between the mobile station and each base station. A packet of data to be transmitted from a first mobile station to a second mobile station is first sent from the first station to the base station via a first channel (upstream/uplink) and then forwarded by the base station to the second mobile station via a second channel (downstream/downlink). Therefore, to enable communication between mobile stations in a particular region, a base station shall be installed that has a communication range covering that region. Therefore, an infrastructure of base stations has to be created to enable communication.

A U.S. Pat. No. 5,481,539 discloses a radio communication TDMA system comprising a plurality of mobile units. The mobile units receive packets transmitted by other units and repeat these packets to other units in a time slot other than the time slot assigned to that mobile unit.

A PCT patent application WO2011035440 discloses a method of facilitating radio communications that involves receiving and transmitting messages on a plurality of channels using various radio technologies, such as TDMA or CDMA. WO2011035440 does not relate to organization of packets within a single time slot of a TDMA system.

There are situations, when communication over a plurality of mobile stations must be provided in an environment without a pre-installed infrastructure of base stations. Moreover, there are environments wherein installation of base stations would be problematic. Examples of such environments include open environments such as large unpopulated areas (e.g. deserts), or limited environments such as underground mines or caves.

Transmission of signal in long, narrow and curved tunnels, such as adits in an underground mine, may require use of repeaters in order to transmit the signal from one end to another end of the tunnel. A radio repeater is a radio receiver and transmitter that retransmits a radio signal to extend the range of coverage of the radio signal. Various types of repeaters can be utilized for this purpose, including repeaters configured for open-space networks. However, the known radio repeater systems typically require considerable power resources to operate, both at the repeater and the communicating stations. This can be particularly troublesome in harsh environments, such as underground mines, wherein the equipment should be easy to install and should utilize low power to operate, e.g. to be battery-operated for a long time.

There is therefore a need to provide a simple radio communication system which can solve at least some of the problems associated with the known systems, such as: communication over an open environment, communication over a limited environment, communication over a long, narrow and curved tunnel, a need to provide a pre-installed infrastructure of base stations or repeaters, bandwidth required for data transmission, power required for data transmission, simultaneous transmission of signal between multiple stations.

SUMMARY

There is disclosed herein a radio communication repeater for operating in a TDMA-type radio communication system with a plurality of time slots to transmit packets, each packet comprising a recipient identifier, the repeater comprising: a transmitter configured to transmit a plurality of the packets in a transmit time slot assigned to that repeater; a receiver configured to receive a plurality of the packets from all other time slots of the TDMA radio communication system other than the transmit time slot assigned to that repeater; characterized in that it further comprises: a controller configured to, if the received packets have different recipient identifiers, forward the received packets for transmission by the transmitter in the transmit time slot assigned to that repeater as a frame comprising a plurality of packets having different recipient identifiers.

The repeater may have assigned a time slot in a first channel and the receiver is configured to receive a plurality of the packets from all time slots not assigned to that repeater in the first channel and to receive a plurality of the packets from all time slots of at least one other channel, different than the first channel.

The receiver can be configured to store the received packets in a receive buffer and the controller is configured to read the received packets from the receive buffer according to the FIFO method.

The controller can be configured to forward the received packets read from the receive buffer to a transmit buffer and the transmitter is configured to transmit the packets from the transmit buffer according to the FIFO method.

The repeater may further comprise a cache buffer configured to store packet identifiers of the packets; wherein the controller is configured to copy, from the receive buffer to the transmit buffer, the packets having the packet identifier that is different than the packet identifiers stored in the cache buffer and to add the packet identifier of the copied packet to the cache buffer.

The receiver can be configured to read the packet identifier of the received packet, before receiving the payload of the packet, and to check whether the packet identifier is already stored in the cache buffer and if so, to skip receiving the payload of that packet.

The recipient identifier may correspond to a plurality of recipients.

The plurality of packets can be transmitted in a single time slot as a single frame having a preamble common for all packets.

There is also disclosed a radio communication system comprising a plurality of repeaters as described herein.

The system may further comprise at least one radio communication station, the station comprising: a station identifier; a transmitter configured to transmit at least one packet in a transmit time slot assigned to that station; a receiver configured to receive a plurality of the packets from all other time slots of the TDMA radio communication system other than the transmit time slot; and a controller configured to direct the received packets, for which the recipient identifier corresponds to the station identifier of that station, to a packet processing module.

The radio communication stations and the repeaters may have assigned time slots of the same communication channel.

The repeaters may have assigned time slots of a first communication channel and the radio communication stations have assigned time slots of a second communication channel distinct from the first communication channel; and wherein the receiver of the station is configured to receive a plurality of the packets from all time slots not assigned to that station in the second channel and to receive a plurality of the packets from all time slots of the first channel.

The repeaters arranged consecutively along a signal transmission path may have non-consecutive time slots assigned.

There may be no dedicated downlink channels nor time slots assigned to any of the repeaters within the radio communication system.

There is also disclosed a method for repeating packets by a repeater in a TDMA-type radio communication system with a plurality of time slots to transmit the packets, each packet comprising a recipient identifier, the method comprising: receiving a plurality of the packets from all time slots of the TDMA radio communication system other than a transmit time slot assigned to that repeater; checking whether each of the plurality of the received packets has been already received by that repeater and if so, disregarding the already received packet and if not, directing the packet for transmission; characterized in that: if the received packets have different recipient identifiers, transmitting the received packets in the transmit time slot assigned to that repeater as a frame comprising a plurality of the packets having different recipient identifiers.

Therefore, according to the present disclosure, the received packets to be repeated are transmitted in a common frame in the transmit time slot assigned to the repeater, by constructing a single frame with packets having different recipient identifiers. Therefore, the repeater transmits only in a single time slot within the TDMA channel. This has the advantage that only a single time slot of the TDMA channel is occupied by the repeater, therefore its transmission does not interfere with transmission of other devices on other time slots. As a result, the system employing the repeaters as described above is able to provide transmission of streaming media (such as real-time voice communication/conversation) between distant points of the network, by use of repeaters arranged between these points, wherein the delay of transmission depends on the number of repeaters between the points and is substantially constant. Therefore, the system can be used to transmit real-time data with a predictable delay. Moreover, if all stations of the system are configured to receive data from all other time slots of the TDMA radio communication system other than the transmit time slot, then there is no need to assign to each of the stations a separate downlink time slot, which improves the use of the system bandwidth. The stations can receive packets directed to them directly from the sender or from the data transmitted between the repeaters. Moreover, the bandwidth resources are optimized due to the fact that the need to send ACK messages is reduced or eliminated.

BRIEF DESCRIPTION OF FIGURES

The method and system are presented by way of examples on a drawing, in which.

DETAILED DESCRIPTION

Figure 1:
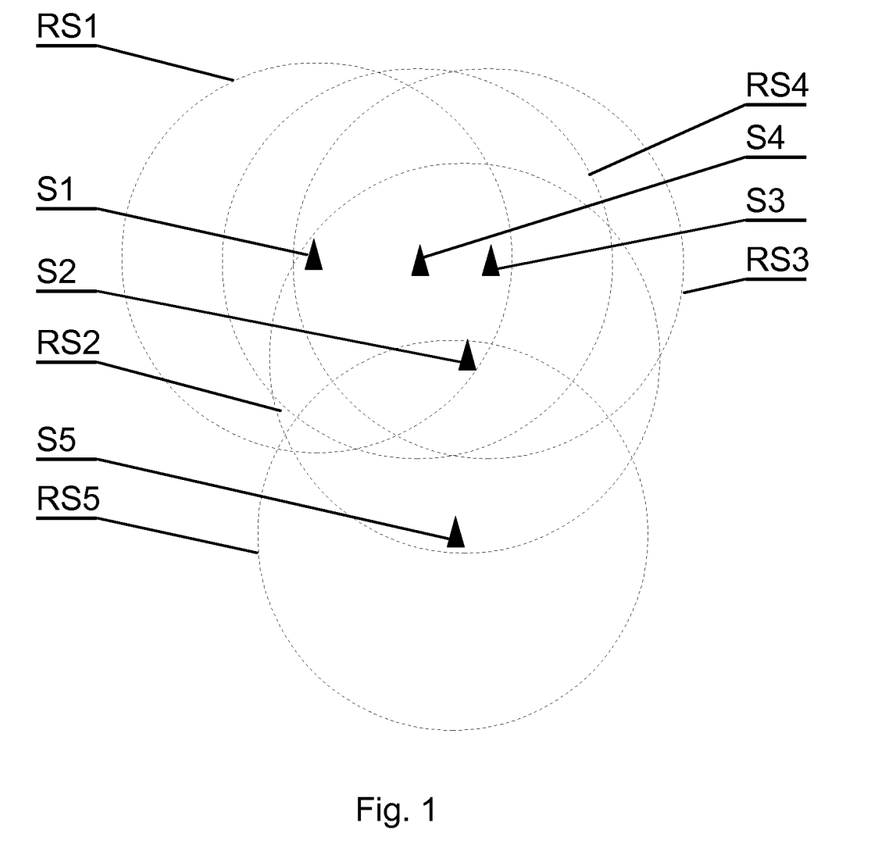
FIG. 1 shows an example of an open-space environment with a plurality of mobile stations.

FIG. 1 shows an example of an open environment with a plurality of stations S1-S5, preferably mobile stations, in which the radio communication system as presented herein may operate. The environment is assumed to be a large open space, in which there are present a plurality of mobile stations S1-S5. For the sake of clarity, a communication range RS1-RS5 is the same for each station, but it can differ, depending e.g. on the transmission power of each station, the kind of antenna used etc. In the example presented, the stations S1-S4 can communicate with each other directly, as they are within their communication ranges RS1-RS4. In turn, the station S5 is within the communication range of the station S2 only, therefore it can communicate directly with the station S2 and cannot communicate directly with the stations S1, S3 and S4.

The first aim of the system presented herein is to provide easy communication between the stations without the use of a pre-installed infrastructure. This is achieved by providing a transmission system based on TDMA, wherein packets have a defined recipient. Each mobile station has a particular TDMA channel assigned for transmission. Each mobile station listens to all other TDMA channels to extract packets directed for that station. Thereby, in a single time slot, one station can send packets directed to a plurality of other stations. The other stations are able to receive the packets directed to them instantaneously after they have been sent. This will be explained in details with reference to a structure of a mobile station as presented in FIG. 2 and packet flow as presented in FIG. 3.

Figure 2:
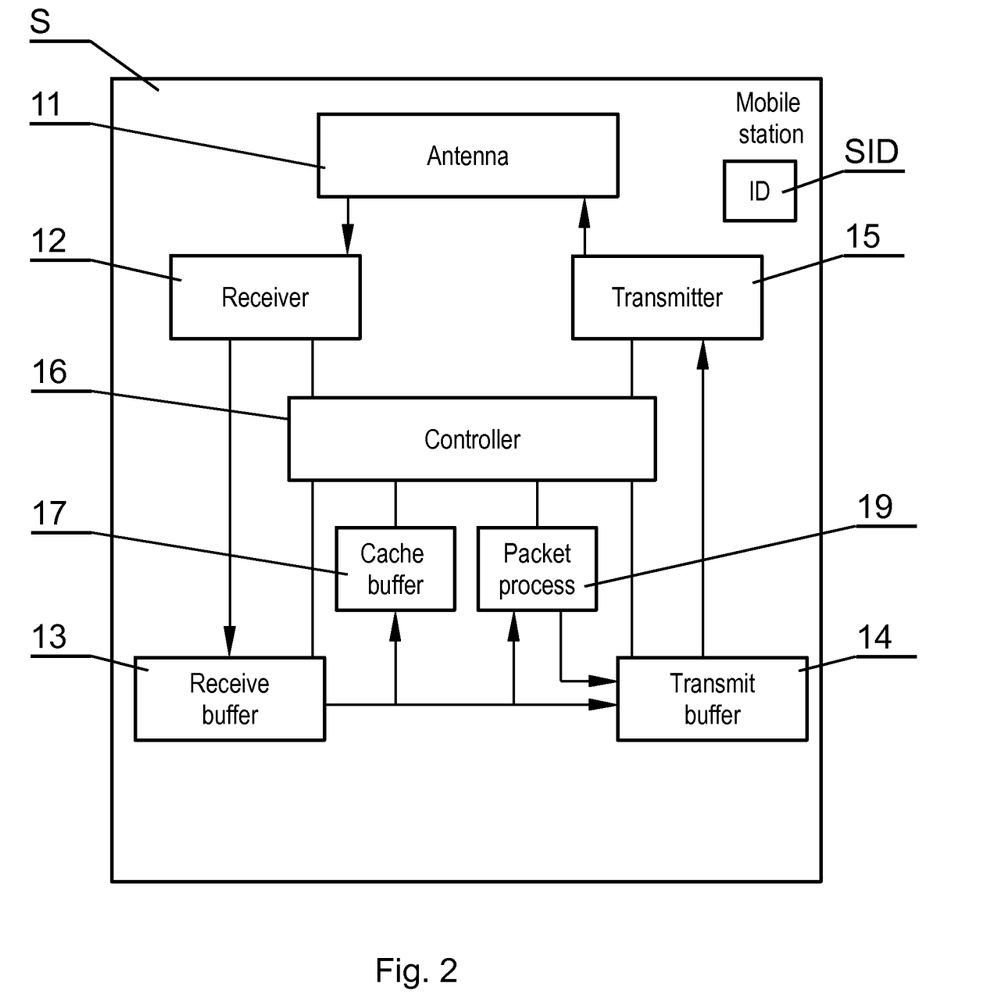
FIG. 2 shows a structure of a station.

FIG. 2 shows a structure of a station S, preferably a mobile station, having assigned a particular station identifier—SID. The mobile station S comprises a transmitter 15 configured to transmit a signal containing data packets from a transmit buffer 14 in the time slot(s) assigned to the particular station S, i.e. in the particular TDMA channel(s) assigned to that station. During the other time slots, the station S receives signals transmitted by the other entities within the communication system via the receiver 12, which stores the data packets extracted from the received signal in a receive buffer 13. Therefore, the station transmits data in one or more assigned time slots of assigned TDMA channels (transmit slots) and receives data from the other time slots of all TDMA channels (receive slots). A controller 16 is configured to control the operation of the receiver 12, the transmitter 15 and to process data stored in the receive buffer 13 and in the transmit buffer 14, according to the procedure shown in FIG. 3. The receiver 12 and the transmitter 15 are preferably connected to a common antenna 11. A cache buffer 17 stores packet IDs and other packet-related data of packets received in the station. The receive buffer 13 and the transmit buffer 14 are preferably FIFO-type buffers. The cache buffer 17 is a cyclic buffer. The station S comprises packet processing elements 19 for processing of the received packets and generating packets to be transmitted. For example, the station S may comprise an audio processor for processing audio data packets to be reproduced as sound via sound output such as a loudspeaker or headphones. The station S may also comprise an audio generator for generating audio data packets based on sound received from a microphone and directed to particular other stations, depending on communication settings input by the user via a user interface.

Figure 3:
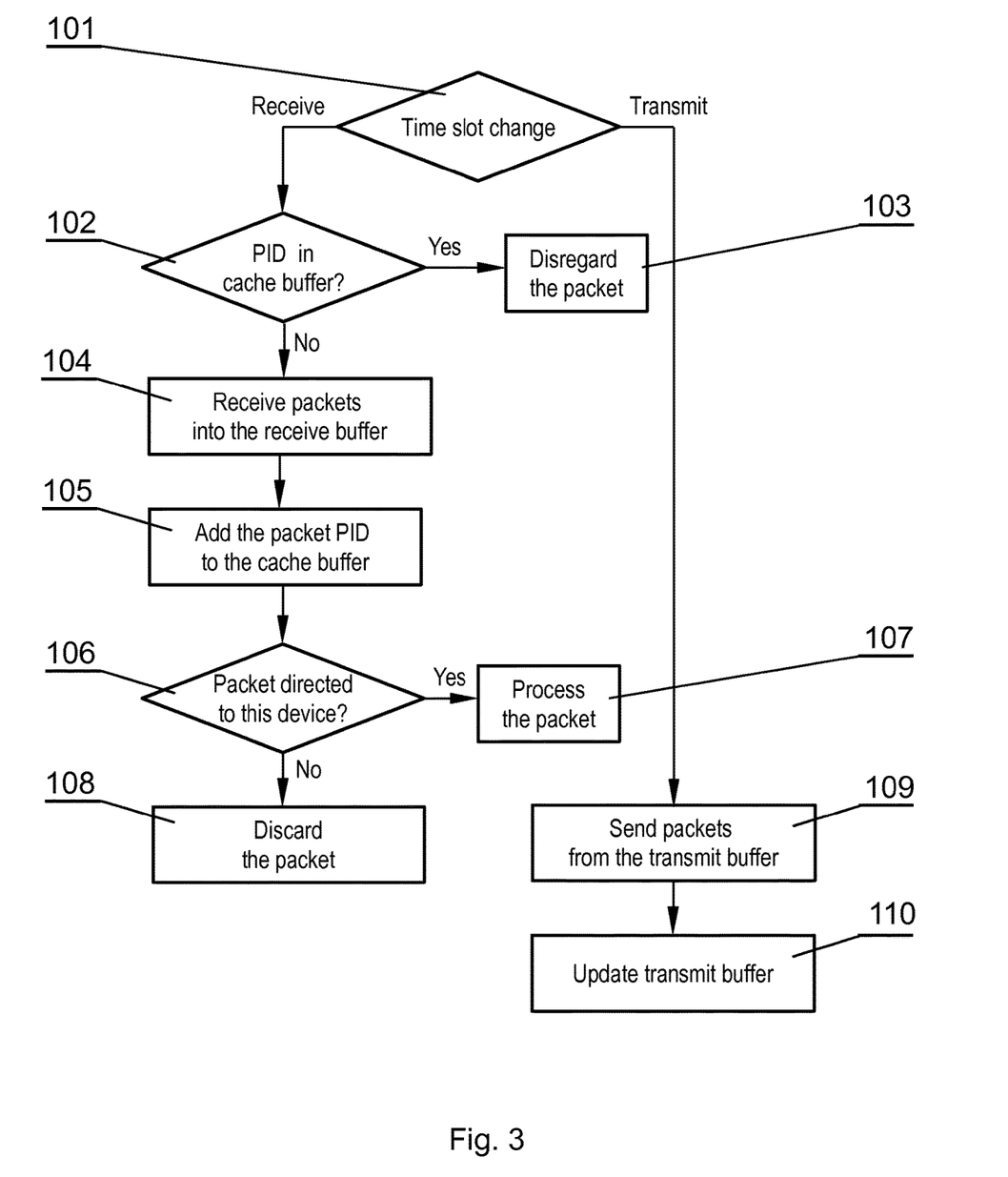
FIG. 3 shows a procedure of operation of the station.

The stations S are configured to operate according to the procedure shown in FIG. 3. When a time slot starts in step 101, it is checked whether the slot is a receive or transmit slot (as described further in the description, the device may operate in one channel or two different channels, therefore the initiation of operation of a time slot may be performed simultaneously for both channels and therefore two procedures of this type may be performed simultaneously).

During the receive slot, the controller orders in step 102 the receiver 12 to read the header of the packet to determine the identifier PID of the packet and to check whether the packet identifier PID is already present in the cache buffer 17. If so, the packet is disregarded in step 103. If not, the controller orders in step 104 the receiver 12 to receive the payload of that packet and to store the packet in the receive buffer 13. If the packet is received correctly in full, the PID of the packet is added to the cache buffer 17 in step 105. A plurality of receivers 12 can be used, each one configured to receive the packet data in parallel, in order to reduce the error rate (according to the diversity technique). Next, it is checked in step 106 (by comparing the recipient identifier with the identifier of this device) whether the packet is directed to this device. If the packet is directed to this device, the packet is sent in step 107 from the receive buffer 13 to the packet processing element 19 responsible for processing the particular packet type (for example, audio data packets are directed to an audio processor and text message packets are directed to a text message processor). In that case, the station may generate a packet with an acknowledgement (ACK) message directed to the repeater from which that packet was received. However, in another embodiment it is even possible that the station does not generate an ACK message in order to reduce bandwidth resources. If the recipient identifier of the packet is different than the station identifier SID of this station, the packet is discarded in step 108.

If the time slot is a transmit slot, then in step 109 the controller orders the transmitter 15 to send data packets from the transmit buffer 14. The data packets in the transmit buffer are pre-generated by the packet processing elements 19, such as an audio generator. A plurality of packets may be sent in a single time slot, depending on the capacity of the time slot. The packets are transmitted from the transmit buffer 14 according to the First In, First Out (FIFO) method. In case the length of packets in the transmit buffer 14 is greater than the capacity of the time slot, only the first packets awaiting the transmission are sent and then the other packets will be sent in the next transmit slot. After transmission, the transmit buffer 14 is updated according to the FIFO rules in step 110.

The station S may transmit unicast packets (i.e. directed to a particular other device with a specific recipient identifier) or multicast packets (i.e. directed to a group of devices) or broadcast packets (i.e. directed to all devices).

The station S is configured to receive packets from all time slots that are not assigned to that station. Therefore, it is able to receive packets transmitted by all other devices operating in the system, i.e. the other stations, repeaters and combined stations/repeaters.

By providing the stations S1-S5 to operate according to the procedure of FIG. 2, efficient communication is effected over a TDMA-type system between a plurality of stations which are within the communication range of each other. In a single time slot, the station S may transmit a plurality of packets to a plurality of recipients. All stations are configured to receive packets from all time slots, therefore they hear the transmitted packets instantaneously and can receive them and process them just after they are transmitted. There is no need to use a base station as an intermediary between the mobile stations. There is also no need to assign channels for communication between particular stations, as each station broadcasts messages directed to all other stations in a single channel.

The system is particularly useful in environments with difficult propagation—even if a retransmitted packet is lost, it can be still retransmitted by other repeaters, which introduces high diversity to the system. This increases the likelihood of receipt of the packet by the recipient.

As a consequence, there is no need to assign to each station separate dedicated transmit (uplink) and receive (downlink) time slots—it is enough if each station has only a transmit (uplink) time slot assigned and is configured to receive data from all other time slots of the TDMA radio communication system other than the transmit time slot. The slot assigned to the device is therefore a common transmission and repeating time slot (from the point of view of the transmitting station) and a downlink time slot (from the point of view of all other receiving devices). This improves the bandwidth capabilities of the system as compared to prior art systems wherein downlink time slots were assigned to each device. The stations can receive packets directed to them directly from the sender or from the data transmitted between the repeaters.

Moreover, in contrast to the prior art, the system reduces the needs for sending acknowledgement (ACK) messages from a recipient to the sender in case there is a need to confirm that the packets have been received. The sender can be confirmed of the receipt of the packet by the receiver (i.e. any station that can "hear" the sender and retransmit the message further) by noticing that the station has repeated the packet. In other words—if the packet is repeated, this confirms that it was received by another station in the system and that station takes the care of the further transmission of the packet. Therefore, the acknowledgement messages can be sent only upon receipt of the packet by the final recipient, that does not repeat the packet.

Furthermore, a repeater can determine, from which of the other repeaters packets originating from a particular sender are received first. If a repeater receives a packet from another repeater that is closer to the recipient, there is no need to retransmit the packet. Similarly, there is no need to retransmit the packet if the repeater is the recipient of the packet.

Figure 4:
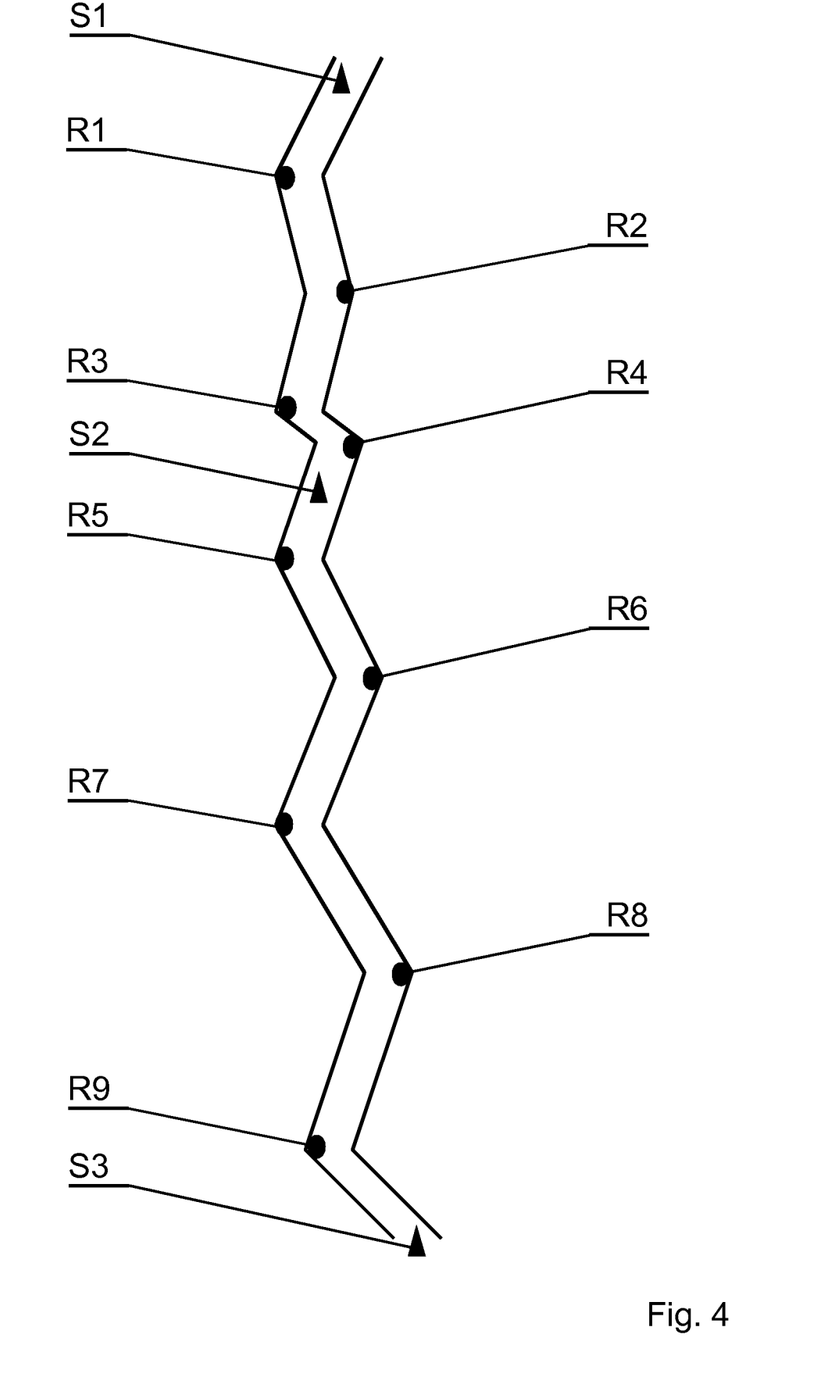
FIG. 4 shows an example of a limited environment.

The system can be further improved by providing repeaters that retransmit the received packets. This is particularly useful in limited environments, such as a long, narrow and curved tunnel, over which the signal cannot propagate from one end to another, as shown in FIG. 4. The repeaters R1-R9 are supposed to be installed between the positions across the tunnel wherein the signal transmission is unacceptably degraded, for example at the bends of the tunnel. The communication system is designed to allow simultaneous communication (i.e. exchange of data, such as audio data packets to allow simultaneous conversation) between a plurality of radio stations S1-S3, which generate their own signals and receive signals from other stations.

The system is designed such as to equalize the signal transmission delay in both directions, i.e. to have the signal transmission time from station S1 to station S3 the same or at least close to the signal transmission time from station S3 to station S1. Each station S1-S3 may generate a signal, such as audio data packets P. Each entity S1-S3, R1-R9 is assigned a time slot TS. The number of time slots in the system can be smaller than the number of entities S1-S3, R1-R9, when it is assumed that the signals from distant entities do not disturb each other. For example, if in the system presented in FIG. 4 the signal is not able to travel a distance longer than the distance between 3 repeaters, e.g. the signal from repeater R5 reaches only repeaters R4, R3, R6 and R7, but not R1, R2, R8, R9, then it is enough to have the channel divided into 5 time slots only.

Assuming for example that the system comprises 9 repeaters R1-R9 and 3 stations S1-S3 and the TDMA channel is divided into 5 time slots TS1-TS5, the following stations S and repeaters R may have assigned the following time slots TS: S1-TS1; R1-TS2; R2-TS3; R3-TS4; R4-TS5; S2-TS1; R5-TS2; R6-TS3; R7-TS4; R8-TS5; R9-TS1; S3-TS2.

Since it is assumed that the signal from repeaters R1, R5 cannot reach each other efficiently, it is not a problem in that they utilize the same slot TS2 of the TDMA channel.

The number of time slots in the system can be setup by the system operator or can be adjusted automatically by the system, depending on the system configuration, using known techniques.

Figure 5:
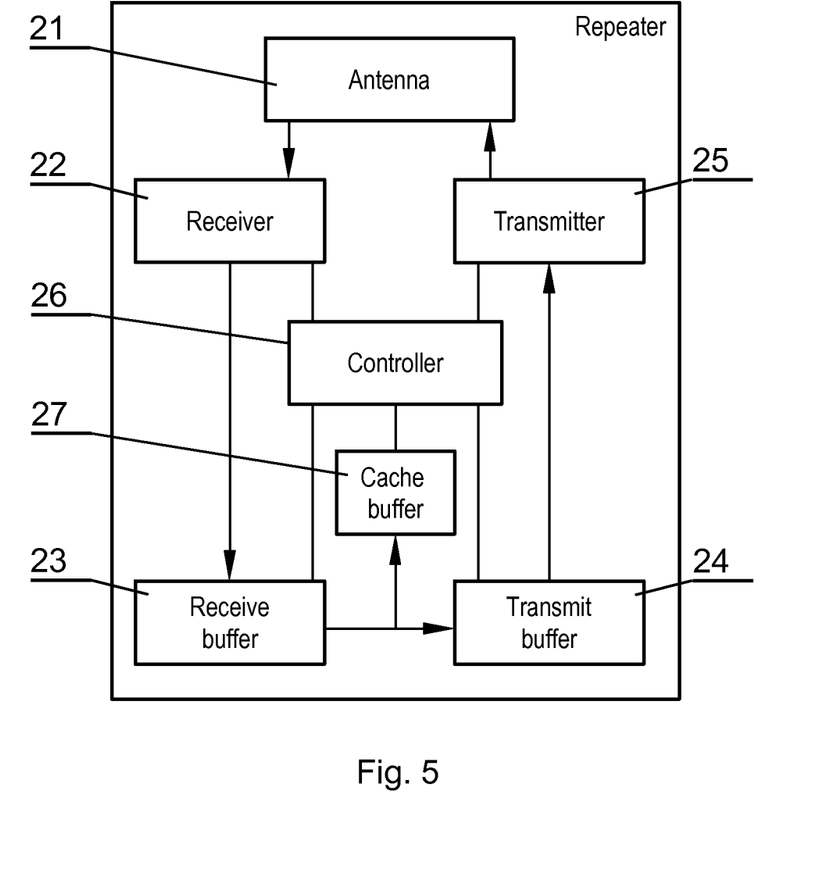
FIG. 5 shows an example of a structure of a repeater.

FIG. 5 shows an example of a structure of a repeater R. The repeater R comprises a transmitter 25 configured to transmit a signal containing data packets from a transmit buffer 24 in the time slot(s) assigned to the particular repeater R. During the other time slots, the repeater R receives signals transmitted by the other stations S and repeaters R via the receiver 22, which stores the data packets extracted from the received signal in a receive buffer 23. A controller 26 is configured to control the operation of the receiver 22, the transmitter 25 and transfer of packets from the receive buffer 23 to the transmit buffer 24 (depending on the contents of a cache buffer 27 that stores packet IDs and other packet-related data), according to the procedure shown in FIG. 6. The receive buffer 23 and the transmit buffer 24 are preferably FIFO-type buffers. The cache buffer 27 is a cyclic buffer. The receiver 22 and the transmitter 25 are preferably connected to a common antenna 21, which is preferably an omnidirectional antenna. Use of the omnidirectional antenna simplifies the use of the system, as the repeaters can be installed at the tunnel at arbitrary positions with respect to each other. This makes the system possible to be installed even by untrained personnel. Moreover, this makes the system tolerant to the change of position between the repeaters, e.g. when the repeater is slightly repositioned or when the configuration of the tunnel is changed.

Alternatively, there can be two or more channels used: a first channel assigned to repeaters R and a second channel assigned to stations S and possibly further channels assigned to repeaters and/or stations.

The channels can be arranged according to FDMA (Frequency Division Multiple Access), i.e. such that the first channel has a different frequency than the second channel. However, other types of channel division may be used as well.

Therefore, the communications between the entities in the system is preferably based on FDMA. In such case, the repeaters R transmit data on the first channel and the stations S transmit data on the second channel, and both devices S, R receive data from their own channel and the other channel. Each channel can be divided to its own time slots. The repeaters R transmit data in the assigned time slots of the first channel and listen to data transmitted by other entities both within the first and second channel. The stations S transmit data in the assigned time slots of the second channel and listen to data transmitted by other entities both within the first and second channel. This is particularly useful in case of mobile devices S. In such case, the stationary repeaters R may have time slots of the first channel assigned statically, while mobile stations S may dynamically change their assigned time slots in the second channel. In such a case, the receivers 12, 22, 32 of the devices shall be able to receive data from two channels simultaneously, i.e. to receive packets from two slots overlapping in time on two different frequency channels. Therefore, a device shall be also able to receive data from a second channel during transmission of data at a first channel. The time slots of the first channel do not have to be synchronized with the time slots of the second channel the time slots may have different durations and/or may start at different times. The number of time slots of the first channel may be different than the number of time slots of the second channel.

If the system uses a single channel, the transmitters 15, 25, 35 and the receivers 12, 22, 32 of each device S, R, RS are configured to operate on the same frequency. In that case, the device transmits packets in one time slot and receives packets from all other time slots of the same channel (e.g. the channel having a particular frequency).

If the system uses two channels, the transmitter 15, 25, 35 of each device is configured to operate either on the first channel or the second channel, depending on the type of the device. The receiver 12, 22, 32 of each device is configured to receive packets from all slots of one channel which are not assigned to the transmitter 15, 25, 35 of this device and from all slots of the other channel.

Figure 6:
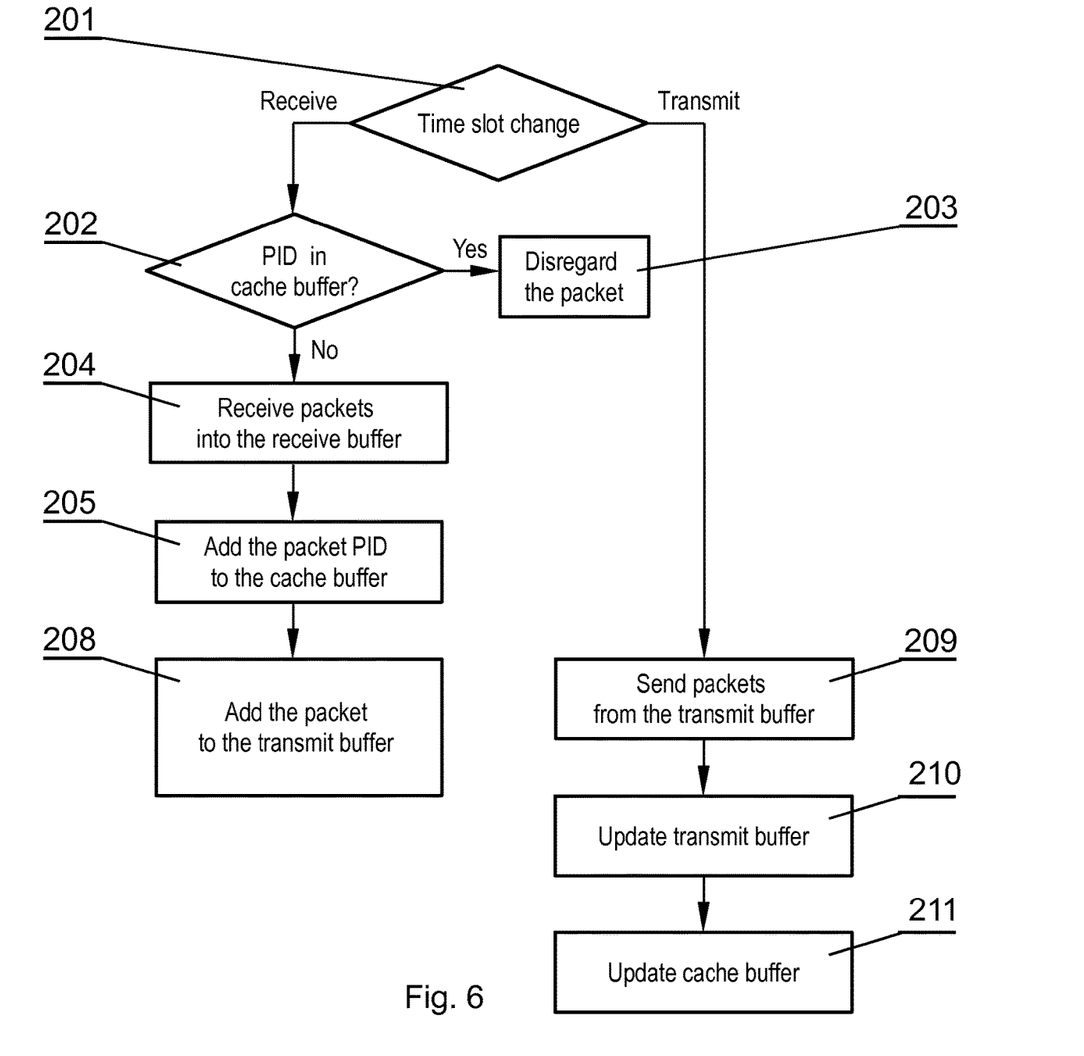
FIG. 6 shows a procedure of operation of the repeater.

The repeaters R are configured to operate according to the procedure shown in FIG. 6.

When a time slot starts in step 201, it is checked whether the slot is a receive or transmit slot (on one channel or simultaneously on two channels, as described with reference to FIG. 3).

During the receive slot, the controller orders in step 202 the receiver 22 to read the header of the packet to determine the identifier PID of the packet and to check whether the packet identifier PID is already present in the cache buffer 27. If so, the packet is disregarded in step 203. If not, the controller orders in step 204 the receiver 22 to receive the payload of that packet and to store the packet in the receive buffer 23. If the packet is received correctly in full, the PID of the packet is added to the cache buffer 27 in step 205. A plurality of receivers 22 can be used, each one configured to receive the packet data in parallel, in order to reduce the error rate (according to the diversity technique). Next, the packet is copied to the transmit buffer 24 in step 208.

In other embodiments, additional packet-related data may be stored in the cache buffer 27, such as the time of reception of the packet.

Alternatively, the repeater may be also configured to process the packets itself—then it may operate according to steps 302-308 as explained with reference to FIG. 9.

If the time slot is a transmit slot, then in step 209 the controller orders the transmitter 25 to send data packets from the transmit buffer 24. A plurality of packets may be sent in a single time slots, depending on the capacity of the time slot. The packets are transmitted from the transmit buffer 24 according to the First In, First Out (FIFO) method. In case the length of packets in the transmit buffer 24 is greater than the capacity of the time slot, only the first packets awaiting the transmission are sent and then the other packets will be sent in the next transmit slot. After transmission, the transmit buffer 24 is updated according to the FIFO rules in step 210. In step 211, the cache buffer 27 can be updated by deleting therefrom the packets that were received earlier than some predefined clear time.

The cache buffer 27 stores PIDs (packet identifiers) that were copied from the receive buffer 23 to the transmit buffer 24, and therefore have been retransmitted or are going to be transmitted in the following time slot(s). Since only the packets whose PIDs are not already stored in the cache buffer are copied to the transmit buffer 24, then if follows that the repeater R is configured to retransmit these of all of the received data packets, which were not already transmitted or are not already scheduled for transmission by that repeater R in the previous or following time slots.

Therefore, the receiver 22 is configured to read the packet identifier PID of the received packet, before receiving the payload of the packet P, and to check whether the packet identifier PID is already stored in the cache buffer 27 and if so, to disregard that packet. Since the packets already present in the cache buffer 27 are not received in full (the payload is disregarded, e.g. by not reading the data of the specified payload length), the processing power related to the operation of the receiver 22 is optimized. In that case, the receiver 22 reads only the header of the packet, then skips the payload of the length specified in the header, and only then reads the following data, which relate to the header of the next packet in the time slot.

The length of the cache buffer 27 (i.e. the number of packets for which data can be stored in the cache buffer 27) should be limited to a number smaller than the total amount of allowed packets PIDs. For example, if the packet PID field is 8 bits long, the system can generate 256 packets of unique PIDs, therefore the length of the cache buffer should be smaller than 256. This is used in order to delete from the list the packets, whose PIDs have been already used and may be replaced with new packets generated by the stations, having the same PID but containing new data.

Moreover, the length of the cache buffer 27 should be longer than the number of packets that can be transmitted in a single cycle.

When the cache buffer is updated in step 211 by deleting therefrom the PIDs of packets that were transmitted more than a predefined clear time ago, the system allows retransmission of packets after some time. For example, a station S can be configured to number its packets starting from PID=1. If, after a number of packets have been sent, that station is restarted (e.g. due to operational error or user command), it will start numbering the new packets anew, starting from PID=1. In that case, the packets will be retransmitted by the receivers if the predefined clear time is shorter than the restart time of a station.

The repeater R is configured to receive packets from all time slots that are not assigned to that repeater. Therefore, it is able to receive packets transmitted by all other devices operating in the system, i.e. the other stations, repeaters and combined stations/repeaters.

Figure 7A:
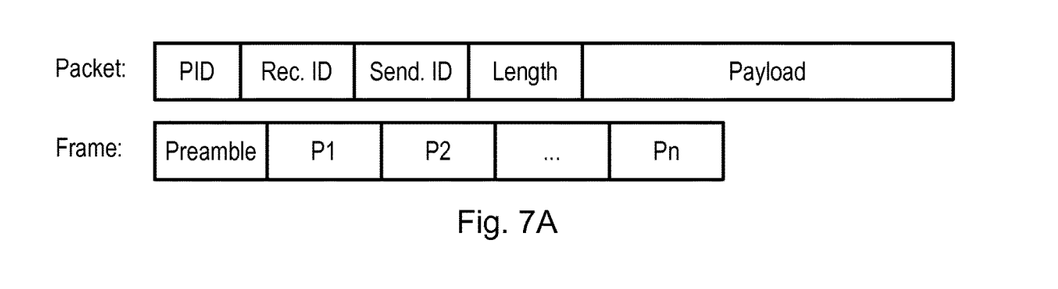
FIG. 7A shows a packet structure.

FIG. 7A shows an example of a structure of a single packet. The packet comprises a packet identifier PID and a recipient identifier Rec. ID that indicates the identifier of the station to which the packet is directed. The recipient identifier Rec. ID may specify a single recipient, a plurality of recipients, a group of recipients or all recipients. Therefore, it can be a unicast or broadcast packet. The packet may further comprise a sender identifier Send. ID that indicates the identifier of the station which generated the packet. A length field defines the length of the following payload. The packet further contains payload data, such as audio data, video data, text data and/or a checksum.

A plurality of packets P having a form as shown in FIG. 7A are transmitted in a single time slot as a single frame F. The frame F has a synchronizing preamble followed by the plurality of packets P1 . . . Pn. Therefore, the frame synchronization is common for all packets, wherein each packet of the frame can be directed to different recipients. In other words, the repeater is configured to construct frames such that a single frame comprises a plurality of packets having different recipient identifiers (Rec. ID). Of course, it is also possible that in some cases (e.g. when all devices transmit frames directed to a single recipient or there is only one other device transmitting in the system to a single recipient) a single frame will comprise packets directed to a single recipient only but generally, in a standard system with a plurality of devices operating simultaneously, such situation will happen rarely.

Figure 7B:
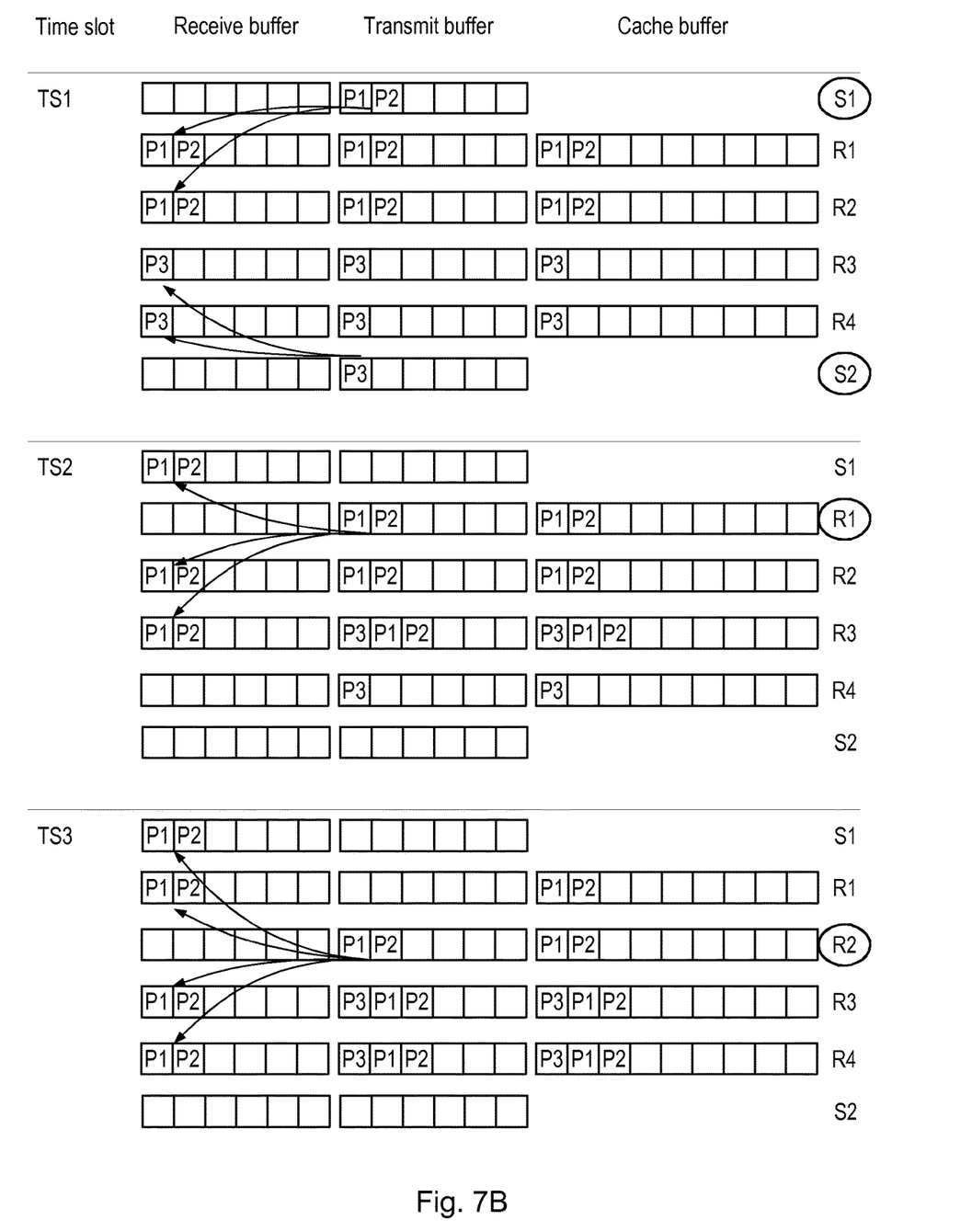
FIG. 7B-7D show schematically a flow of packets.
Figure 7C:
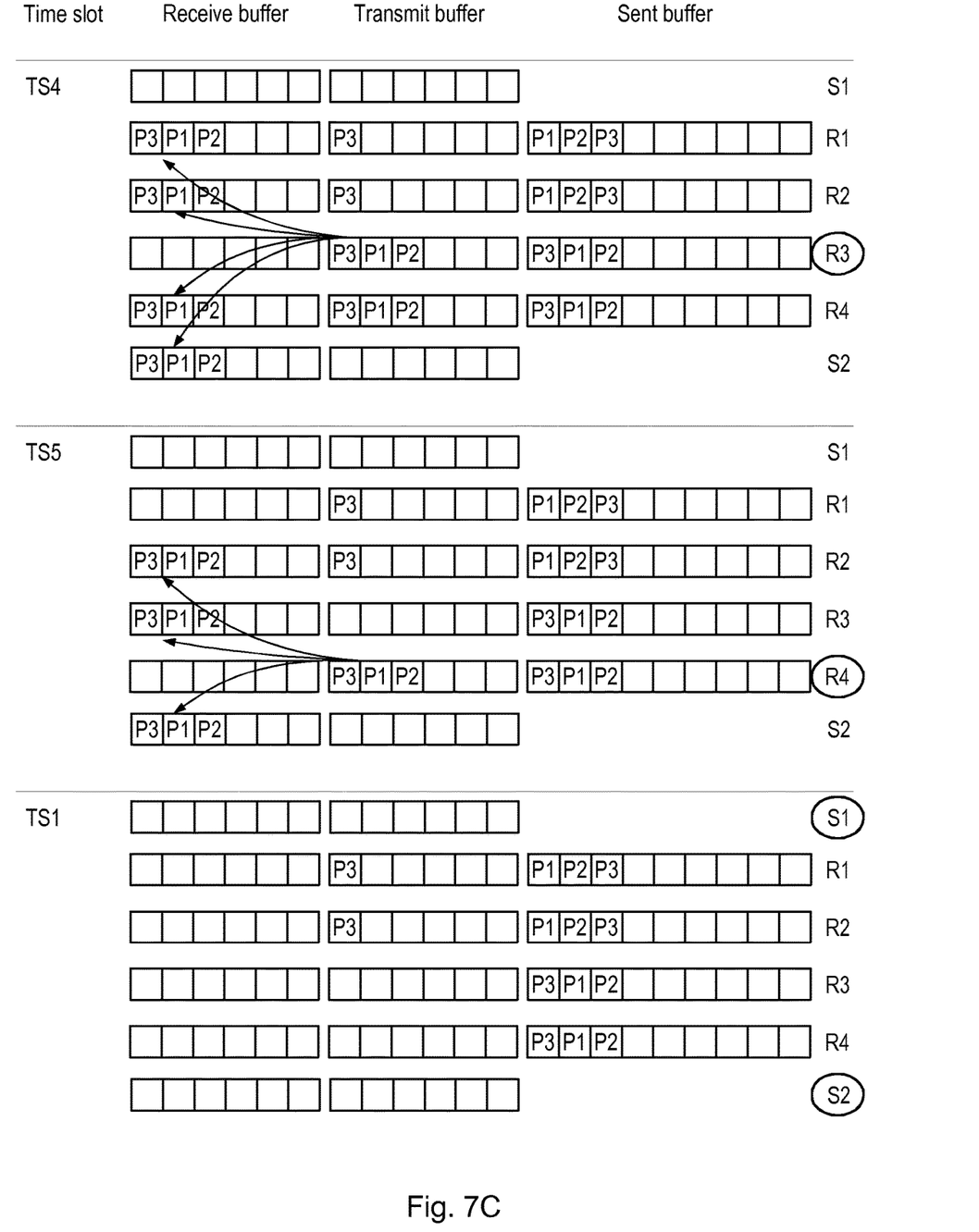
Figure 7D:
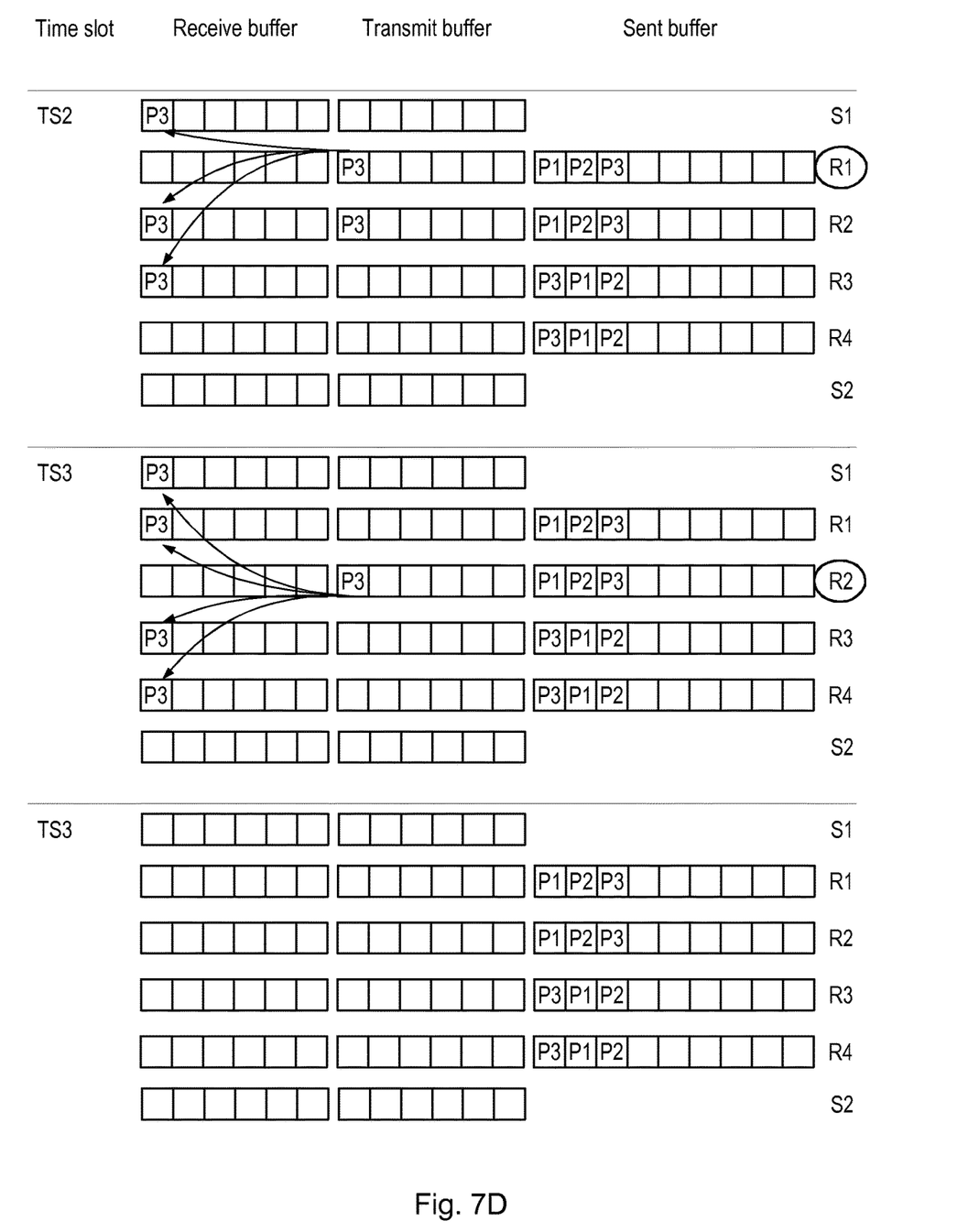

FIGS. 7B-7D show an example of configuration of particular repeaters and data sent in consecutive time slots while communicating in a system having configuration as shown in FIG. 4, wherein stations S1, S2 communicate with each other. The configuration of time slots is as follows: S1-TS1; R1-TS2; R2-TS3; R3-TS4; R4-TS5; S2-TS1

It is assumed that radio stations S (e.g. radio telephones) have their own transmit and receive buffers similar to the buffers of repeaters R.

In time slot TS1, stations S1 and S2 are active. Station S1 sends packets P1, P2, which are received by repeaters R1 and R2. Repeaters R1, R2 copy the received packets P1, P2 to their transmit buffers for retransmission in the consecutive slots, and their ID to the cache buffer for remembering which packets were already handled by them. It is assumed that the repeaters R3, R4 and station S2 are too distant from station S1, therefore the signal does not reach them or is too weak to be received. Station S2 sends packet P3, which is received by repeaters R3, R4, which copy the packet P3 to their transmit and IDs to cache buffers.

In time slot TS2, stations S1 and S2 cleared their transmit buffers after sending packets and repeater R1 is active. Repeater R1 transmits packets P1, P2 from its transmit buffer, which are received by station S1 and repeaters R2, R3. Repeater R2 recognizes that IDs of packets P1, P2 are already in its cache buffer, therefore it does not add these packets to its transmit buffer for retransmission. Repeater R3 receives packets P1, P2 and adds them to its transmit buffer and their IDs to the cache buffer. Station S1 may be configured to reject its own packets received as echo.

In time slot TS3, repeater R1 has its transmit buffer clear and repeater R2 is active. Repeater R2 transmits packets P1, P2 from its transmit buffer, which are received by station S1, repeaters R1, R3 and R4. Station S1 may be configured to reject its own packets received as echo. Repeaters R1 and R3 recognize that IDs of packets P1, P2 are already in their cache buffers, therefore they do not add these packets to their transmit buffer for retransmission. Repeater R4 receives packets P1, P2 and adds them to its transmit buffer and their IDs to the cache buffer.

In time slot TS4, repeater R2 has its transmit buffer clear and repeater R3 is active. Repeater R3 transmits packets P3, P1, P2 from its transmit buffer, which are received by repeaters R1, R2, R4 and station S2. Repeaters R1, R2, R4 recognize that IDs of packets P1, P2 are already in their cache buffer, therefore they do not add these packets to their transmit buffer. Repeater R4 recognizes that ID of packet P3 is already in its cache buffer, therefore it does not add the packet to its transmit buffer. Repeaters R1, R2 receive packet P3 for the first time, therefore they add it to their transmit buffers and its ID to the cache buffers. Packets P3, P1, P2 are received by station S2, which may reject packet P3 as its own echo, but receives packets P1, P2 as new incoming audio data to be reproduced at the station S2.

In time slot TS5, repeater R3 has its transmit buffer clear and repeater R4 is active. Repeater R4 transmits packets P3, P1, P2 from its transmit buffer, which are received by repeaters R2, R3 and station S2. The packets P3, P1, P2 are disregarded by repeaters R2, R3 as their IDs are already in their cache buffer. The packets P3, P1, P2 can be rejected by station S2 as an echo of already received packets.

In the consecutive time slot TS1, repeater R4 has its transmit buffer clear and stations S1, S2 are active, but they have nothing to be transmitted.

In time slot TS2, repeater R1 is active. Repeater R1 transmits packet P3 which is received by station S1 and repeaters R2, R3. Repeaters R2, R3 do not copy packet P3 to their transmit buffer, as its ID is already present in their cache buffer. Station S1 received packet P3 for the first time and may process it e.g. as audio data.

In time slot TS3, repeater R1 cleared its transmit buffer and repeater R2 is active. Repeater R2 transmits packet P3 which is received by station S1 and repeaters R1, R3 and R4. Repeaters R1, R3 and R4 do not copy packet P3 to their transmit buffer, as its ID is already present in their cache buffers. Station S1 receives packet P3 for the second time and may reject it as an echo.

In time slot T4 and following slots, there is no more data to be transmitted, unless stations S1, S2 start transmission or transmission comes from another source, e.g. repeater R5.

A problem of asymmetry in transmission time of a packet may appear, if the successive repeaters (for example R1-R4 of FIG. 4) are assigned successive numbers of time slots (for example, TS1-TS4). Assume that the repeaters "hear" only their neighboring repeaters. In that case, when a packet is transmitted on a path from R1 to R4, it can be repeated by successive repeaters in successive time slots: the repeater R1 will send the packet in time slot TS1, the repeater R2 will repeat the packet in time slot TS2, and so on in a most optimistic scenario, the packet will travel from R1 to R4 in 3 time slots in a single cycle of consecutive time slots. However, if a packet is to be transmitted back from R4 to R1, it will be sent by R4 in time slot TS4, then by R3 in time slot TS3 of the next cycle of time slots therefore, it may take many times longer for the packet to travel backwards. In order to reduce this effect and to make the transmission in all directions equal, the time slots arranged to devices in the system shall be arranged in a special manner. This can be done in various ways. In a static system, wherein the positioning of the repeaters is known, the time slots can be assigned statically, for example: R1→TS1, R2→TS3, R3→TS2, R4→TS4. Alternatively, the order of time slots can be selected randomly. In general, to reduce asymmetry in data transmission, it is advisable for the repeaters arranged consecutively along the signal transmission path to have non-consecutive time slots assigned.

The time slots can be assigned to the devices in a plurality of ways. For example, the time slots can be assigned manually by the user, by inputting a slot identifier via a user interface to the device. Alternatively, the time slots can be assigned by a master device, if such device is present in the system. Furthermore, the time slots can be selected by the devices themselves—a device can analyze the traffic in the TDMA channel and determine slots which are unoccupied—and select (randomly or according to specific criteria) one of the unoccupied slots for its use. As a consequence, the same time slot can be used by devices which are sufficiently distant from each other so that transmission of one device does not interrupt the transmission of the other device.

Figure 8:
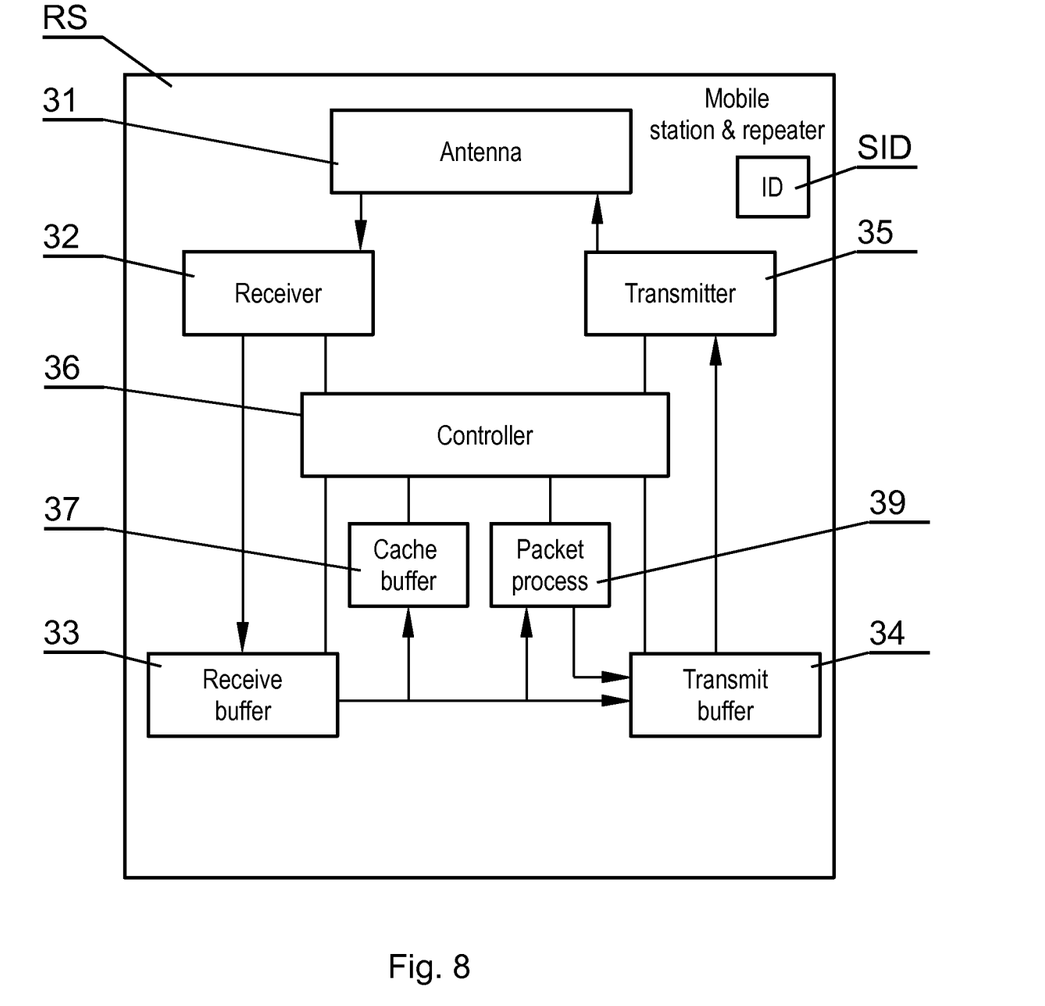
FIG. 8 shows a structure of a combined mobile station and repeater.

FIG. 8 shows an example of a structure of an entity RS that is a combined mobile station and a repeater. It comprises elements 31-35 that are equivalent to the elements 11-15 of the station S and 21-25 of the repeater R. A cache buffer 37 is equivalent to the cache buffer 27 of the repeater R. Packet processing elements 39 are equivalent to the packet processing elements 19 of the station S. This entity RS is particularly useful in situations as shown in FIG. 1, for example in place of station S2, which could serve both as a communication station and a repeater to allow communication between stations S1, S3, S4 and station S5.

Figure 9:
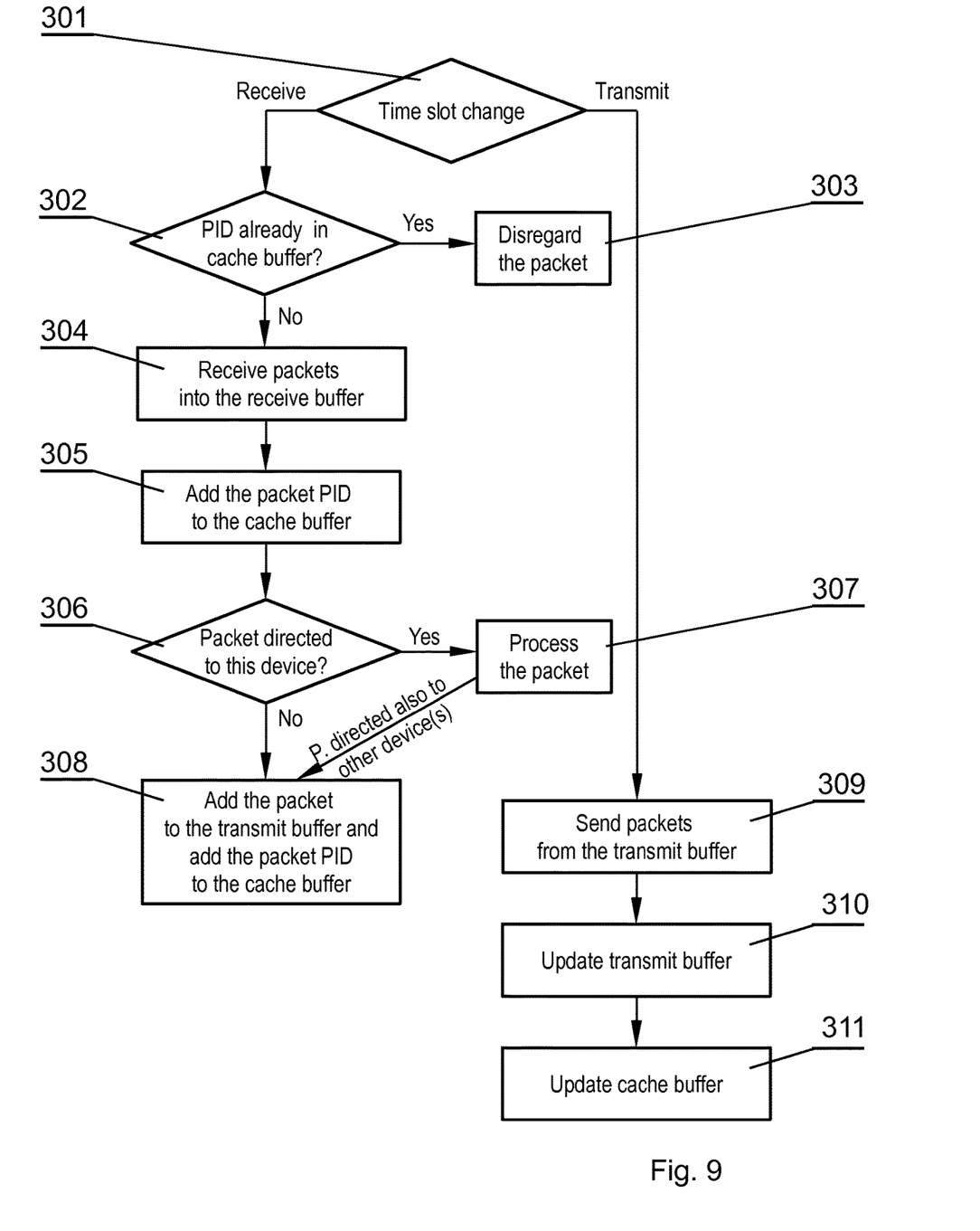
FIG. 9 shows a procedure of operation of the combined mobile station and repeater.

The controller 36 operates according to the procedure of FIG. 9.

When a time slot starts in step 301, it is checked whether the slot is a receive or transmit slot (on one channel or simultaneously on two channels, as described with reference to FIG. 3).

During the receive slot, the controller 36 orders in step 302 the receiver 32 to read the header of the packet to determine the identifier PID of the packet and to check whether the packet identifier PID is already present in the cache buffer 37. If so, the packet is disregarded in step 303. If not, the controller orders in step 304 the receiver 32 to receive data packets into the receive buffer 33. If the packet is received correctly in full, the PID of the packet is added to the cache buffer 37 in step 305. A plurality of receivers 32 can be used, each one configured to receive the packet data in parallel, in order to reduce the error rate (according to the diversity technique). Next, it is checked in step 306 (by comparing the recipient identifier with the identifier of this device) whether the packet is directed to this device and/or to other devices. If the packet is directed to this device or to this device and other devices (e.g. a group comprising this device, or a broadcast packet), the packet is copied in step 307 from the receive buffer 33 to the packet processing element 39 responsible for processing the particular packet type. In that case, the station may generate a packet with an acknowledgement (ACK) message directed to the repeater from which that packet was received. However, in another embodiment it is even possible that the station does not generate an ACK message in order to reduce bandwidth resources. If the packet is directed to at least one other device, then in step 308 that packet is copied to the transmit buffer 34.

If the time slot is a transmit slot, then in step 309 the controller orders the transmitter 35 to send data packets from the transmit buffer 34. The packets in the transmit buffer 34 are the packets that have been copied thereto from the receive buffer 33, as well as the packets generated by the packet processing elements 39. After transmission, the transmit buffer 34 is updated according to the FIFO rules in step 310. In step 311, the cache buffer 37 can be updated by deleting therefrom the packets that were received earlier than some predefined clear time.

The combined station and repeater RS is configured to receive packets from all time slots that are not assigned to that device. Therefore, it is able to receive packets transmitted by all other devices operating in the system, i.e. the other stations, repeaters and combined stations/repeaters.

The invention claimed is:

1. A radio communication repeater for operating in a Time Division Multiple Access (TDMA) radio communication system with a plurality of time slots to communicate packets, each packet comprising a recipient identifier, the repeater comprising:
 a transmitter configured to transmit a plurality of the packets in a transmit time slot assigned to the repeater;
 a receiver configured to receive a plurality of the packets from all other time slots of the TDMA radio communication system other than the transmit time slot assigned to the repeater, and to store the received plurality of the packets in a receive buffer;
 a cache buffer configured to store packet identifiers (PID) of the received plurality of the packets; and
 a controller configured to:
  i) read the received plurality of the packets from the receive buffer according to a First In, First Out (FIFO) method;
  ii) check whether each of the received plurality of the packets has been already received by the repeater and if so, disregard the already received packet and if not, direct the packet for transmission, and, if the received plurality of the packets have different recipient identifiers, to forward the received plurality of the packets to a transmit buffer for transmission by the transmitter in the transmit time slot assigned to the repeater as a frame comprising the plurality of packets having different recipient identifiers; and
  iii) copy, from the receive, buffer to the transmit buffer, the plurality of the packets having the packet identifier (PID) that is different than the packet identifiers (PID) stored in the cache buffer and to add the packet identifier (PID) of each of the copied plurality of the packets to the cache buffer.

2. The repeater according to claim 1, wherein the receiver is configured to read the packet identifier (PID) of each of the received plurality of the packets, before receiving a payload of each of the received plurality of the packet, and to check whether the packet identifier (PID) is already stored in the cache buffer and if so, to skip receiving the payload of those packets.

3. The repeater according to claim 1, wherein the recipient identifier corresponds to a plurality of recipients.

4. The repeater according to claim 1, wherein the plurality of the packets transmitted in a single time slot as a single frame having a preamble common for all the plurality of the are packets.

5. A radio communication system comprising a plurality of repeaters, each repeater of the plurality of repeaters corresponding to the radio communication repeater of claim 1.

6. The radio communication system according to claim 5, further comprising at least one radio communication station, the at least one radio communication station comprising:
 a station identifier (SID);
 a station transmitter configured to transmit at least one packet in a transmit time slot assigned to the at least one radio communication station;
 a station receiver configured to receive the plurality of the packets from all other time slots of the radio communication system other than the transmit time slot; and
 a station controller configured to direct the received plurality of the packets, for which the recipient identifier corresponds to the station identifier (SID) of the at least one radio communication station, to a packet processing module.

7. The radio communication system according to claim 6, wherein the at least one radio communication station and the plurality of repeaters have assigned time slots of a first communication channel.

8. The radio communication system according to claim 6, wherein the transmit time slot assigned to the repeater is in a first communication channel and the transmit time slot assigned to the at least one radio communication station is in a second communication channel distinct from the first communication channel; and wherein the station receiver of the at least one radio communication station is configured to receive the plurality of the packets from all other time slots other than the transmit time slot assigned to the at least one radio communication station in the second communication channel and to receive the plurality of the packets from all time slots of the first communication channel.

9. The radio communication system according to claim 5, wherein at least a subset of the plurality of repeaters are arranged consecutively along a signal transmission path, and wherein the repeaters in the subset have assigned non-consecutive time slots.

* * * * *